US005943005A

United States Patent [19]

Tanizaki et al.

[11] Patent Number: 5,943,005

[45] Date of Patent: Aug. 24, 1999

[54] MULTILAYER DIELECTRIC LINE CIRCUIT

[75] Inventors: Toru Tanizaki, Kyoto; Hiroshi Nishida, Kawanishi, both of Japan

[73] Assignee: Murata Manufacturing Co., Ltd., Japan

[21] Appl. No.: 08/897,250

[22] Filed: Jul. 18, 1997

[30] Foreign Application Priority Data

Jul. 19, 1996 [JP] Japan .................................... 8-190844

[51] Int. Cl.[6] ............................. G01S 7/28; H01P 1/201; H01P 7/10

[52] U.S. Cl. ............................ 342/175; 342/70; 343/778; 333/202; 333/219.1; 333/239; 333/248

[58] Field of Search ................................ 333/202, 219.1, 333/208, 230, 239, 248; 342/175, 70; 343/778

[56] References Cited

U.S. PATENT DOCUMENTS

| | | | |
|---|---|---|---|
| 5,416,492 | 5/1995 | Takahashi et al. | 333/237 |
| 5,473,296 | 12/1995 | Ishikawa et al. | 333/248 X |
| 5,770,989 | 6/1998 | Ishikawa et al. | 333/248 |

FOREIGN PATENT DOCUMENTS

| | | | |
|---|---|---|---|
| 1-213001 | 8/1989 | Japan | 333/202 |
| 8-316727 | 11/1996 | Japan | 333/248 |

OTHER PUBLICATIONS

A. Abdelmonem, et al., "Full–Wave Design of Spurious Free D.R. Te Mode Band Pass Filters", *IEEE Transactions of Microwave Theory and Techniques*, vol. 43, No. 4, Part 1, Apr. 1, 1995, pp. 744–752.

S. Xu, et al. "Scattering Properties of Discontinuities in NRD Guide", *IEEE Proceedings: Microwaves, Antennas and Propagation*, vol. 141, No. 3, Part H, Jun. 1, 1994, pp. 205–210.

Nallo Di C., et al., "Experimental Investigation on NRD–Guide Dual–Mode Filters", *IEEE MTT–S International Microwave Symposium Digest*, San Diego, May 23,–27, 1994, vol. 1, pp. 237–240.

Y. Ishikawa, et al., "Planar Type Dielectric 1, 2, Resonator Filter at Millimeter–Wave Frequency", *IEICE Transactions on Electronics*, vol. E79–C, No. 5, May 1, 1996, pp. 679–684.

I.J. Bahl, et al., "Aperture Coupling Between Dielectric Image Lines", *IEEE Transactions on Microwave Theory and Techniques*, vol. 29, No. 9, Sep. 1981, pp. 891–896.

*Primary Examiner*—Seungsook Ham
*Attorney, Agent, or Firm*—Ostrolenk, Faber, Gerb & Soffen, LLP

[57] ABSTRACT

A multilayer dielectric line circuit in which a dielectric line circuit has a multilayer structure so as to be easily formed with a small overall size. In one form of the invention, first and second dielectric strips and first and second dielectric resonators are provided between respective adjacent pairs of conductor plates. The first dielectric strip and the first dielectric resonator, the first and second dielectric resonators, and the second dielectric resonator and the second dielectric strip are each coupled electrically or magnetically so as to couple the respective dielectric strips in the different layers.

17 Claims, 11 Drawing Sheets

FIG. 13A
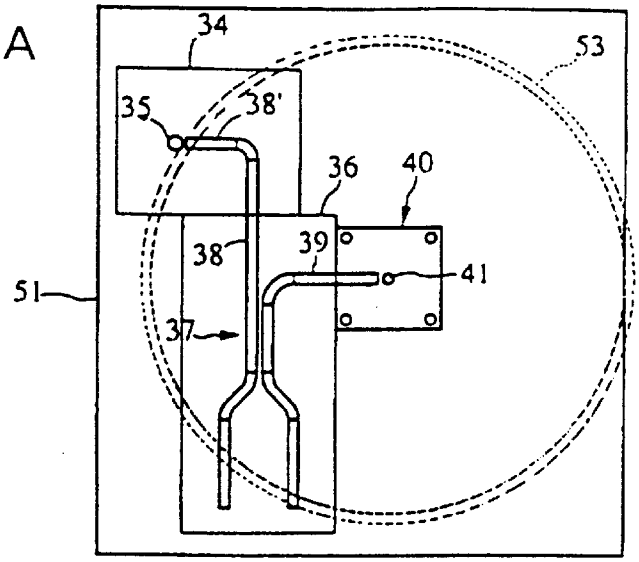
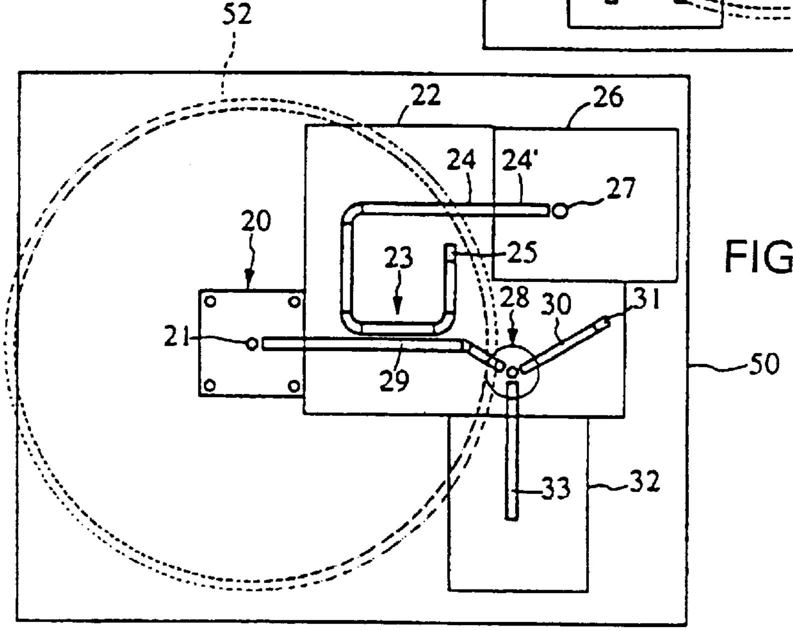
FIG. 13B
FIG. 13C
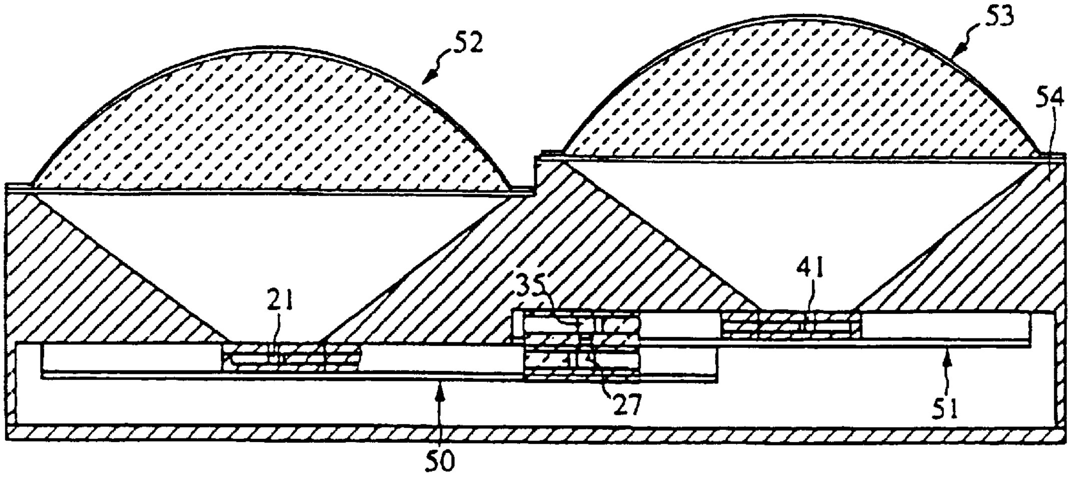

MULTILAYER DIELECTRIC LINE CIRCUIT

BACKGROUND OF THE INVENTION

1. Field of the Invention

The present invention relates to an integrated circuit including a dielectric line of the type comprising a dielectric strip disposed between two parallel conductor planes.

2. Description of the Related Art

Circuits using a dielectric line, in which electromagnetic waves propagate along a dielectric strip inserted between two parallel conductor planes, have been developed as integrated circuits for use in a microwave band or a millimeter-wave band. When such a dielectric line is formed, various types of construction have been adopted. For example, an oscillator, a circulator, a mixer or the like may be formed as a module and such modules may be placed in a predetermined positional relationship, thus forming one integrated circuit. Or, several circuit elements may be arranged between two conductor plates and integrated to form a single integrated circuit.

With the above-described constructions, in a conventional dielectric line circuit, the circuit elements are disposed within nearly the same plane in order to form one integrated circuit. Therefore, if the scale of the entire circuit is increased, the entire circuit is enlarged along the plane direction and thus will have a larger area. By providing the circuit with a multilayer structure, reduction of the area is possible; however, in the conventional technology, it is not possible to cause electromagnetic waves to propagate through the dielectric line in a direction vertical to the conductor plate of the dielectric line.

FIG. 16 is a schematic cross-section of a dielectric line circuit with a multilayer structure showing one attempt that has been made to address these problems. In FIG. 16, reference numerals 60, 61, 63 and 64 each denote a conductor plate. Dielectric strips indicated by reference numerals 62 and 65, each provided between two conductor plates, form two dielectric lines in this example. The end portions of the dielectric strips 62 and 65 are formed into a tapered shape, and further, the end portions of the conductor plates 61 and 63 are also formed into a tapered shape, to form an interface between the dielectric line and a waveguide 66. Thus the upper dielectric line and the lower dielectric line are connected by the waveguide 66.

However, as shown in FIG. 16, in a multilayer structure, wherein a dielectric line is connected to a hollow waveguide, problems arise in that large dimensions along the interlayer direction (thickness direction) are required, and further, a space is required in the conversion section between the dielectric line and the waveguide, so a small overall size cannot be achieved.

SUMMARY OF THE INVENTION

An object of the present invention, which solves the above-described problems of the prior art, is to provide a multilayer dielectric line circuit which can be easily formed with a small overall size.

To achieve the above-described object, according to one aspect of the present invention, a multilayer dielectric line circuit is an integrated circuit using a plurality of dielectric lines, each comprising a dielectric strip disposed between two nearly parallel conductor planes, wherein the plurality of dielectric lines are disposed so as to form a plurality of layers, and dielectric lines in different respective layers are connected to each other via dielectric resonators. With this construction, the dielectric lines in each layer perform their normal function, and the dielectric resonators interconnect the dielectric lines which are disposed in the different layers; thus the dielectric lines of the different layers are connected via the dielectric resonators, and, as a result, interlayer connection is achieved.

According to another aspect of the present invention, as a specific arrangement having dielectric strips and dielectric resonators, a dielectric line having a plurality of layers is formed by three or more substantially parallel conductor plates, a dielectric strip and a dielectric resonator being disposed between each adjacent pair of said conductor plates, and the dielectric resonators being disposed close to each other so as to connect these dielectric resonators, so that the dielectric lines of the various layers are connected via the dielectric resonators. With this construction, a multilayer structure can be achieved without wasting space between the layers corresponding the adjacent dielectric lines.

Further, by providing in a single layer a plurality of dielectric lines which are all connected to the dielectric resonators in that layer, the plurality of dielectric lines are also connected to each other via the dielectric resonators in that layer, so a multi-branching circuit having, for example, three or more ports can be formed within a limited space.

The degree of connection between the dielectric resonators can be set and adjusted by providing a conductor pattern for connection adjustment between the dielectric resonators.

Further, by arranging for a dielectric resonator which performs interlayer connection to be one of the dielectric resonators in a multiple-stage dielectric resonator filter, a passband of the interlayer connector can be made wider.

The above and further objects, aspects and novel features of the invention will become more apparent from the following detailed description when read in connection with the accompanying drawings.

BRIEF DESCRIPTION OF THE DRAWINGS

FIGS. 13A, 13B and 13C show the construction of a front-end apparatus for a millimeter-wave radar according to a sixth embodiment of the present invention;

DESCRIPTION OF EMBODIMENTS OF THE INVENTION

Figure 1A:
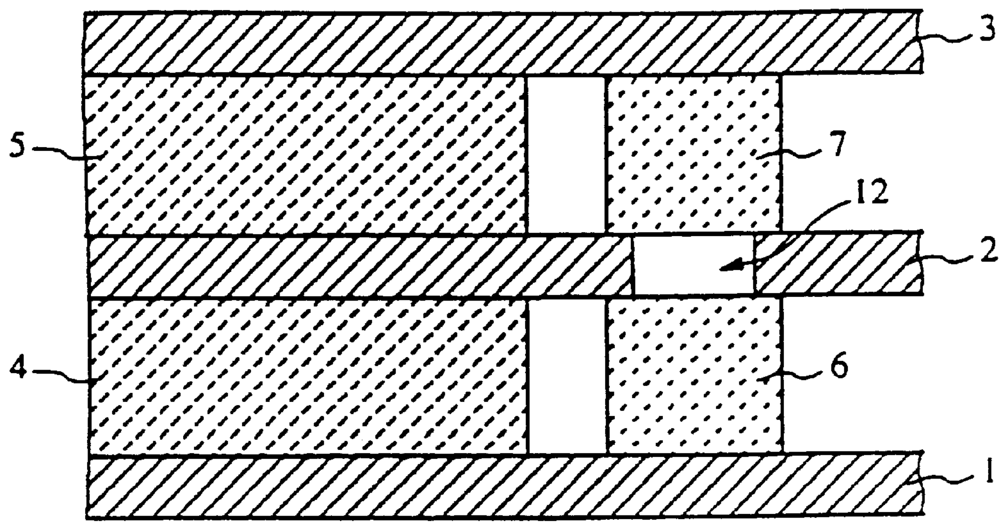
FIG. 1A is a sectional view of a multilayer dielectric line circuit according to a first embodiment of the present invention.
Figure 1B:
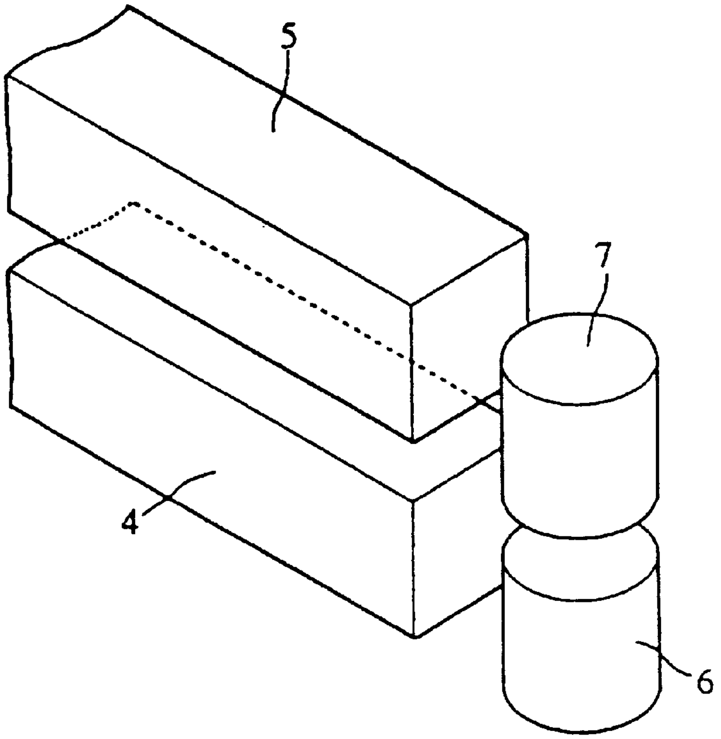
FIG. 1B is a partial perspective view thereof.
Figure 2:
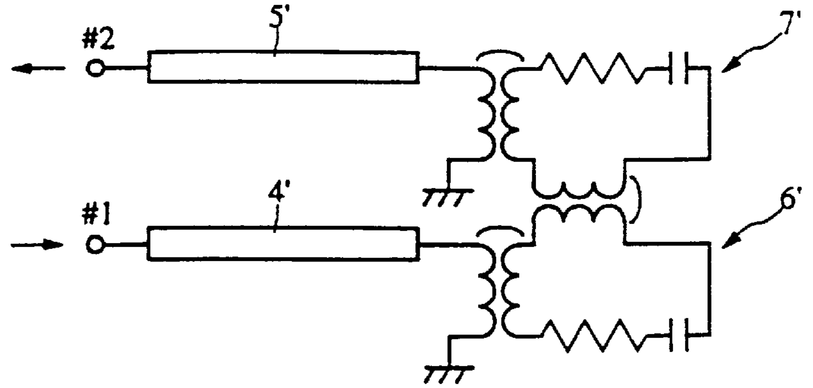
FIG. 2 is an equivalent circuit diagram of the multilayer dielectric line circuit shown in FIGS. 1A–1B.

The construction of a multilayer dielectric line circuit according to a first embodiment of the present invention is shown in FIGS. 1A, 1B and 2. FIG. 1A is a sectional view of the relevant portion of the multilayer dielectric line circuit. FIG. 1B is a partial perspective view of the relevant portion thereof, in which the illustration of three conductor plates is omitted. In FIG. 1A, reference numerals 1, 2, and 3 each denote a conductor plate, with a pair of parallel conductor planes being formed by the conductor plates 1 and 2, and another a pair of parallel conductor planes being formed by the conductor plates 2 and 3. As shown in FIG. 1A, a dielectric strip 4 and a cylindrical dielectric resonator 6 are disposed between the conductor plates 1 and 2, and a dielectric strip 5 and a cylindrical dielectric resonator 7 are disposed between the conductor plates 2 and 3. In a part of the conductor plate 2, at the portion sandwiched by the dielectric resonators 6 and 7, a circular opening 12 is formed. The conductor plates 1 and 2 and the dielectric strip 4 form a lower dielectric line, and the conductor plates 2 and 3 and the dielectric strip 5 form an upper dielectric line.

Here, the spacing between the conductor plates 1 and 2 and the spacing between the conductor plates 2 and 3 are set to a half-wavelength or less of the propagation wavelength in free space, and each dielectric strip is disposed between a corresponding pair of conductor plates, thus each functions as a nonradiative dielectric line (NRD guide). Each of the dielectric resonators 6 and 7 is a TE011-mode or HE111-mode dielectric resonator, and the dielectric strips 4 and 5 are magnetically connected to the dielectric resonators 6 and 7, respectively. Also, the dielectric resonators 6 and 7 are magnetically connected to each other. The positional relationship between the dielectric strips 4 and 5 with respect to the dielectric resonators 6 and 7, including the distance between the dielectric resonators 6 and 7 and the dielectric strips 4 and 5, is determined so as to obtain a desired external Q. Thus, a band-pass filter of two stages is formed.

FIG. 2 is an equivalent circuit diagram of the multilayer dielectric line circuit shown in FIGS. 1A–1B. In FIG. 2, reference numerals 4' and 5' denote respectively the lower and upper dielectric lines formed by the dielectric strips 4 and 5 and the conductor plates 1, 2 and 3 shown in FIGS. 1A–1B. Reference numerals 6' and 7' denote two resonant circuits formed by the dielectric resonators 6 and 7 and the conductor plates 1, 2 and 3 shown in FIG. 1. Since, as described above, the dielectric line 4' is magnetically connected to the dielectric resonant circuit 6', the dielectric resonant circuit 6' is magnetically connected to the dielectric resonant circuit 7', and the dielectric resonant circuit 7' is magnetically connected to the dielectric line 5', the lower dielectric line 4' is connected to the upper dielectric line 5' via a band-pass filter of two stages. Therefore, a signal having a frequency in the passband of this band-pass filter can be transmitted between ports #1 and #2 shown in FIG. 2. Signals of frequencies outside the passband are attenuated or cut off between ports #1 and #2. A pass band or a cut-off band having these band passing characteristics may be used as required.

Figure 3A:
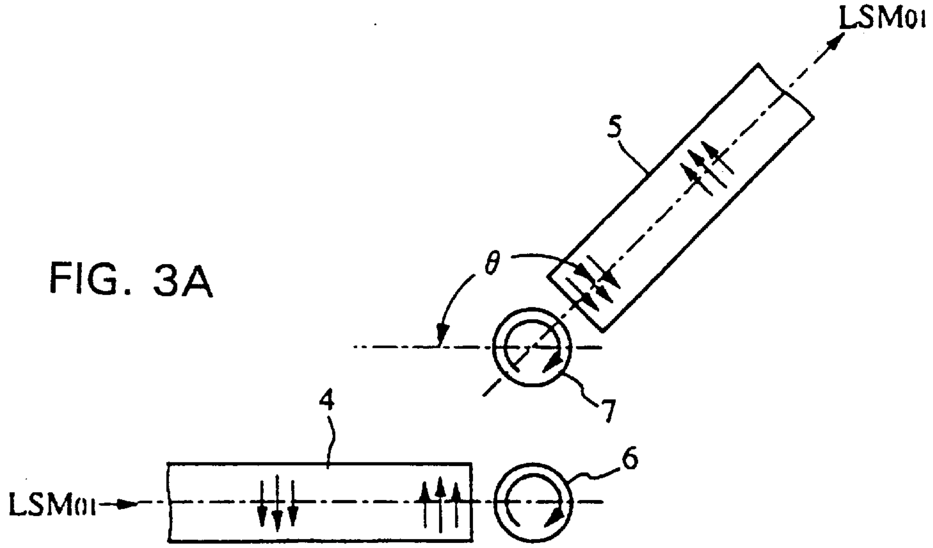
FIGS. 3A and 3B show examples of modifications of the positional relationship of the dielectric strips.
Figure 3B:
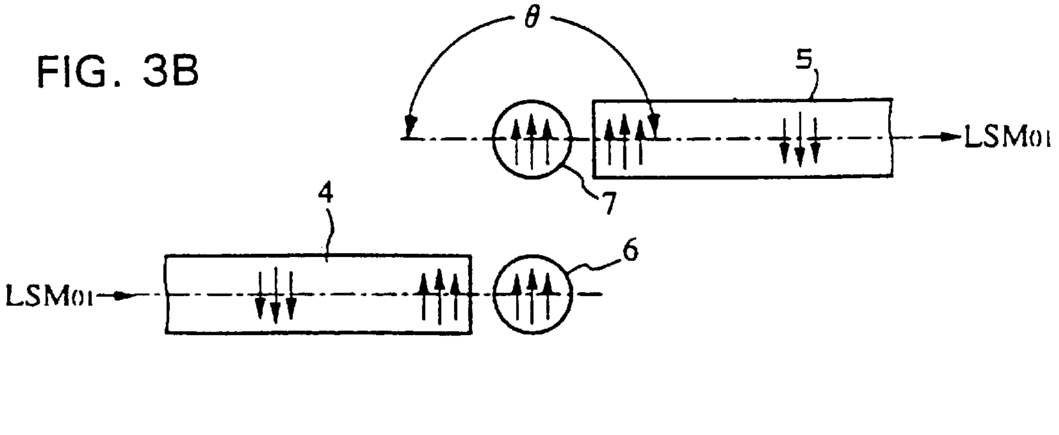

FIGS. 3A and 3B show examples of modifications of the multilayer dielectric line circuit shown in FIGS. 1A–1B. FIGS. 3A and 3B show in plan view the positional relationship of a dielectric strip and a dielectric resonator in an upper layer and the positional relationship between a dielectric strip and a dielectric resonator in a lower layer, with the positions of the upper and lower layers being shifted up and down, respectively, in the figure. In the examples shown in FIGS. 3A and 3B, the dielectric resonators 6 and 7 are disposed coaxially, similar to the case shown in FIGS. 1A–1B, and further, whereas FIGS. 1A–1B the angle θ formed by the dielectric strips 4 and 5 is set to 0° in the example shown in FIGS. 3A and 3B, other predetermined angles are provided.

Even with such positional relationships, if each of the dielectric resonators 6 and 7 is excited in the TE011 mode so as to cause the dielectric strips 4 and 5 to propagate electromagnetic waves of the LSM01 mode, the dielectric resonators function as an interlayer connector. In FIGS. 3A and 3B, the arrows indicate the electric-field distribution (electrical lines of force), the dielectric strip 4 is magnetically connected to the dielectric resonator 6, the dielectric resonators 6 and 7 are magnetically connected, and the dielectric resonator 7 is magnetically connected to the dielectric strip 5.

In the example shown in FIG. 3A, dielectric resonators 6 and 7 of the TE011 mode are used. In this case, electromagnetic waves of the LSM01 mode which propagate through the dielectric strip 4 are then propagated as electromagnetic waves of the LSM01 mode through the dielectric strip 5, via the dielectric resonators 6 and 7.

In the example shown in FIG. 3B, dielectric resonators 6 and 7 of the HE111 mode are used. Also in this case, the dielectric strip 4 and the dielectric resonator 6 are magnetically connected, and the dielectric resonator 7 and the dielectric resonator 6 are magnetically connected.

In the example shown in FIG. 3A, since the electromagnetic-field distribution of the dielectric resonators 6 and 7 is rotationally symmetric about the axis and any value of θ can be determined as desired, this example can be used to change the transmission direction. In contrast, in the example shown in FIG. 3B, interlayer connection is made at a minimum loss when θ=0° or 180°. If θ is an angle other than the foregoing, the LSM01 mode is converted with a percentage of 100−x % and the LSE01 mode is converted with a percentage of x % according to that angle. Therefore, when only the LSM01 mode is used, a loss occurs. Here, x is determined by the angle θ, and x=0% when θ=0° or 180°, and x=100% when θ=90°. As described above, since the conversion percentages of the LSM01 mode and the LSE01 mode are determined by the angle θ formed by the dielectric strips 4 and 5 of the lower and upper layers, it becomes possible to perform mode conversion at the same time as interlayer connection and form a coupling/branching filter.

Figure 4A:
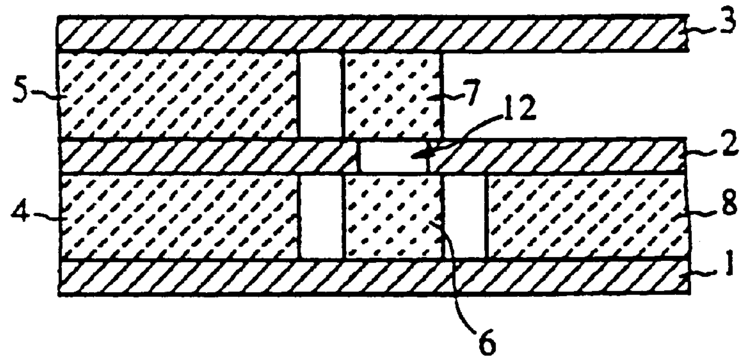
FIG. 4A is a sectional view of a multilayer dielectric line circuit according to a second embodiment of the present invention.
Figure 4B:
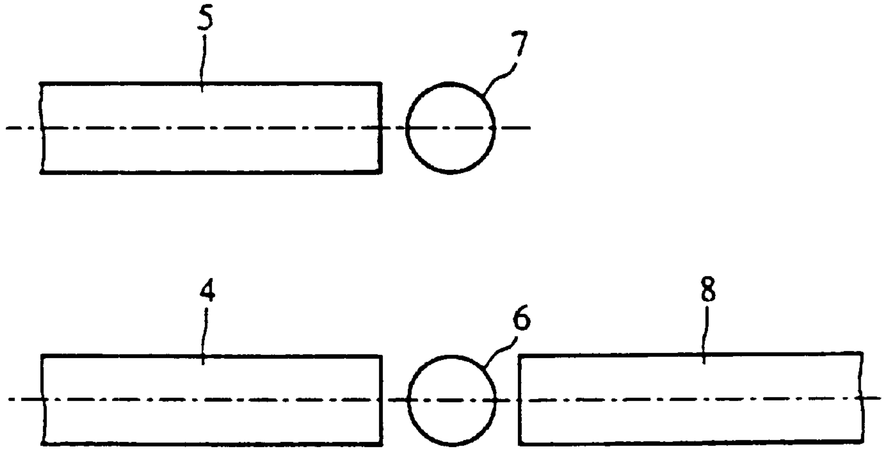
FIG. 4B shows the positional relationship between dielectric strips and dielectric resonators.
Figure 5:
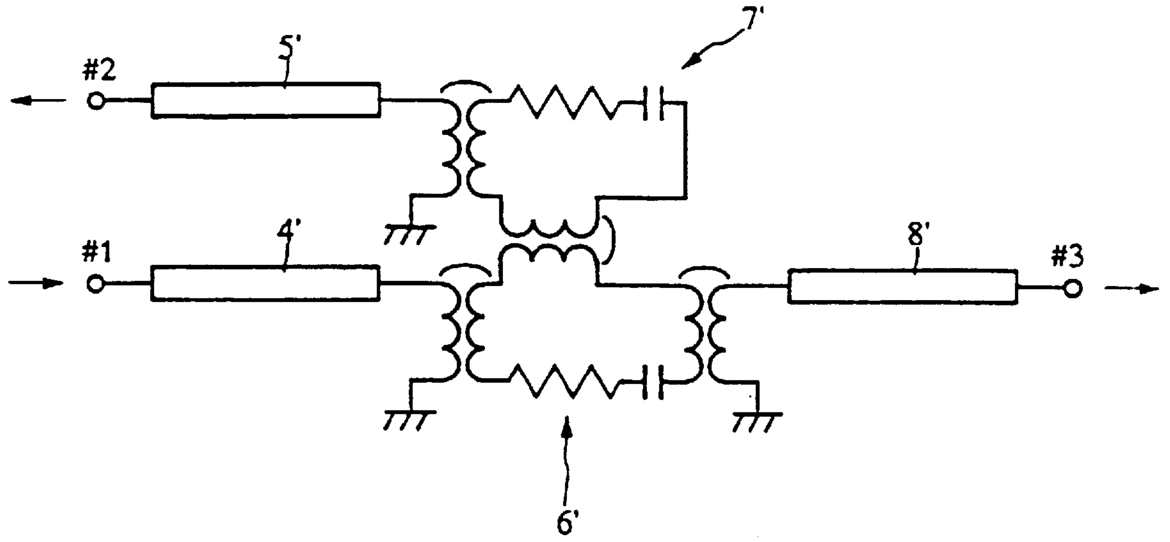
FIG. 5 is an equivalent circuit diagram of the circuit shown in FIGS. 4A–4B.

Next, FIGS. 4A, 4B and 5 show the construction of a multilayer dielectric line circuit according to a second embodiment of the present invention. FIG. 4A is a sectional view of the relevant portion of the multilayer dielectric line circuit. FIG. 4B shows in plan view the positional relationship between two dielectric strips and a dielectric resonator in the lower layer, and the positional relationship between a dielectric strip and a dielectric resonator in an upper layer, with the positions of the two layers being shifted up and down in the figure. Unlike the example according to the first embodiment, in this example, two dielectric strips 4 and 8 which are coupled to the dielectric resonator 6 are provided in the lower layer. The upper layer construction is the same as the construction shown in FIG. 1. FIG. 5 is an equivalent circuit diagram of the circuit shown in FIG. 4. Reference numerals 4', 5' and 8' denote dielectric lines formed by the dielectric strips 4, 5 and 8, respectively, shown in FIG. 4. Reference numerals 6' and 7' denote resonant circuits formed by the dielectric resonators 6 and 7 and the conductor plates 1, 2 and 3 shown in FIG. 4. As described above, the dielectric strips 4 and 8 are each magnetically connected to the dielectric resonator 6, the dielectric resonator 6 is magnetically connected to the dielectric resonator 7, and the dielectric resonator 7 is magnetically connected to the dielectric strip 5, with the result being that the signal, for example, input from port #1, is output to each of ports #2 and #3.

Figure 6A:
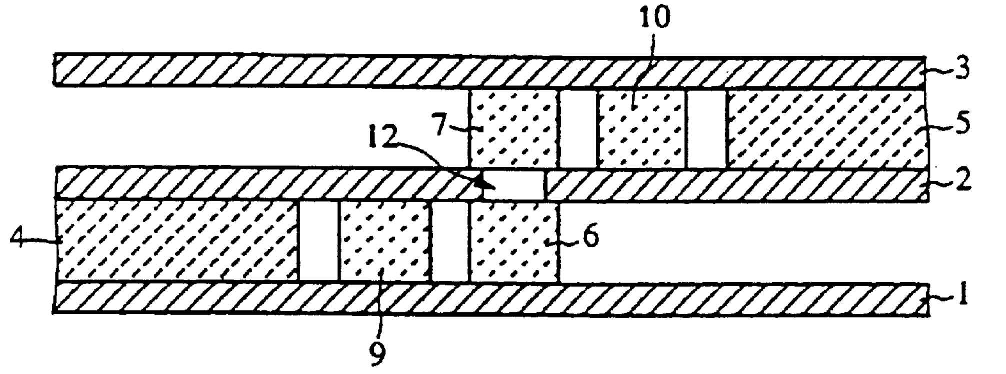
FIG. 6A is a sectional view of a multilayer dielectric line circuit according to a third embodiment of the present invention.
Figure 6B:
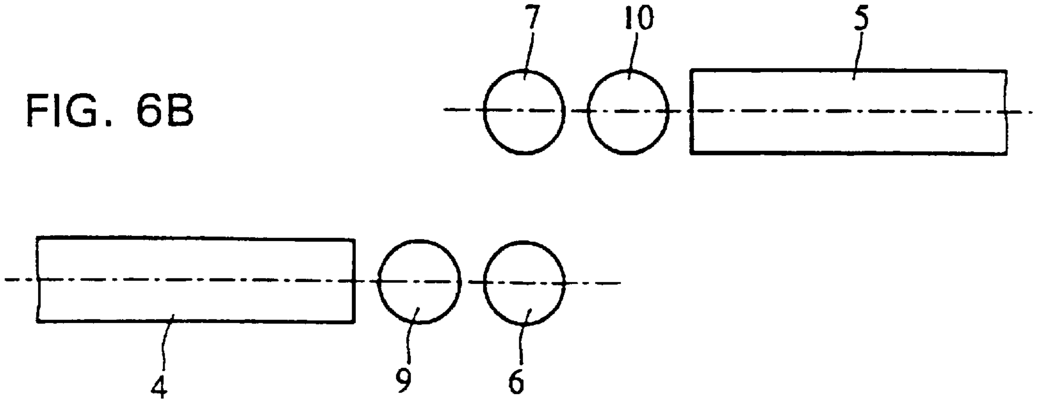
FIG. 6B shows the positional relationship between dielectric strips and dielectric resonators.

FIGS. 6A and 6B show the construction of a multilayer dielectric line circuit according to a third embodiment of the present invention. FIG. 6A is a sectional view of the relevant portion thereof. FIG. 6B shows in plan view the positional relationship between a dielectric strip and two dielectric resonators in an upper layer, and the positional relationship between a dielectric strip and two dielectric resonators in a lower layer, with the positions of the two layers being shifted up and down in the figure. The dielectric resonator 9 is disposed between the dielectric resonator 6 and the dielectric strip 4, the dielectric resonator 10 is disposed between the dielectric resonator 7 and the dielectric strip 5, and the dielectric resonators 6 and 7 perform interlayer connection. The structure of FIGS. 6A and 6B thus becomes equivalent to a band-pass filter formed by a four-stage dielectric resonator filter, provided between the lower dielectric line formed by the conductor plates 1 and 2 and the dielectric strip 4, and the upper dielectric line formed by the conductor plates 2 and 3 and the dielectric strip 5. As described above, formation of multiple stages of resonators makes it possible to achieve a wider bandwidth.

Figure 7A:
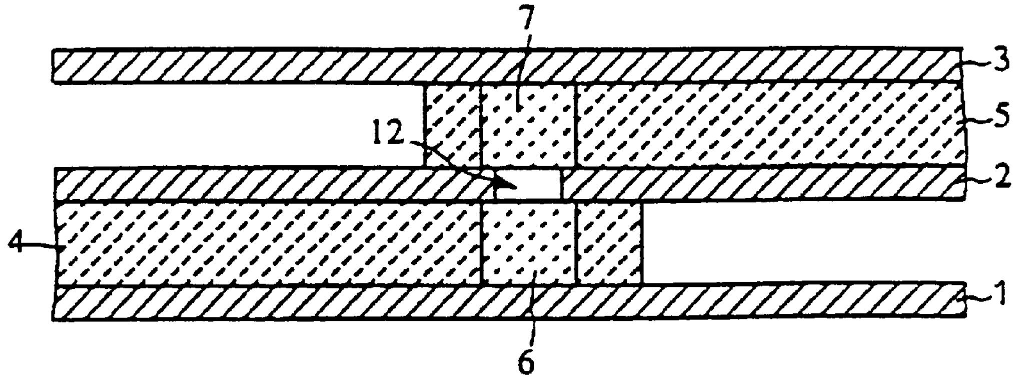
FIG. 7A is a sectional view of a multilayer dielectric line circuit according to a fourth embodiment of the present invention.
Figure 7B:
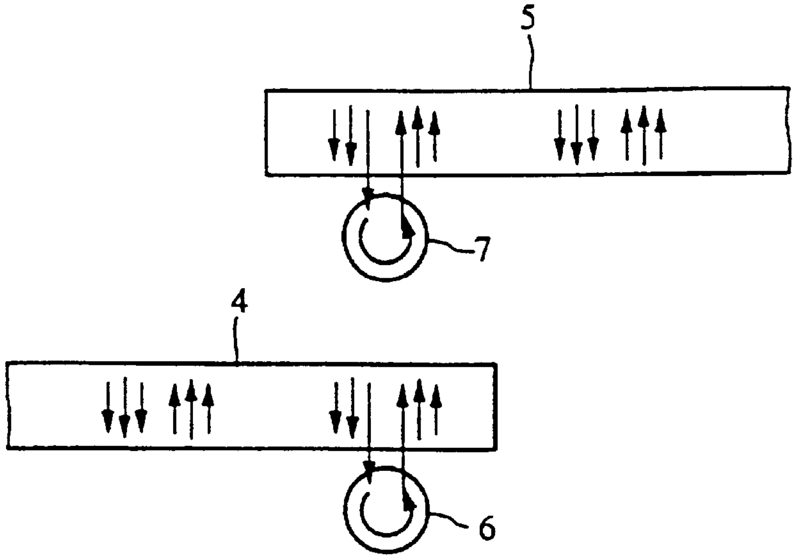
FIG. 7B shows the positional relationship between dielectric strips and dielectric resonators.

FIGS. 7A and 7B show the construction of a multilayer dielectric line circuit according to a fourth embodiment of the present invention. FIG. 7A is a sectional view of the relevant portion thereof. FIG. 7B shows the positional relationship and the connection relationship between a dielectric strip and a dielectric resonator. A dielectric strip 4 and a dielectric resonator 6 are provided between conductor plates 1 and 2, and a dielectric strip 5 and a dielectric resonator 7 are provided between conductor plates 2 and 3. The dielectric resonators 6 and 7 are coaxially disposed, and the dielectric strips 4 and 5 are disposed alongside the dielectric resonators 6 and 7, in a positional relationship spaced apart by a fixed distance from the dielectric resonators 6 and 7, respectively. As a result, as shown by the electrical lines of force in FIG. 7B, the LSM-mode electromagnetic waves which propagate through the dielectric strips 4 and 5 are electrically connected respectively to the dielectric resonators 6 and 7 of the TE011 mode. Further, the upper and lower dielectric resonators 6 and 7 are magnetically connected. Whether the dielectric strip and the dielectric resonator are magnetically connected or electrically connected can be selected as desired. For example, the dielectric strip 4 and the dielectric resonator 6 in the lower layer may be magnetically connected similar to the first to third embodiments, and the dielectric strip 5 and the dielectric resonator 7 in the upper layer may be electrically connected, or conversely, the lower layer may be electrically connected and the upper layer may be magnetically connected.

Figure 8A:
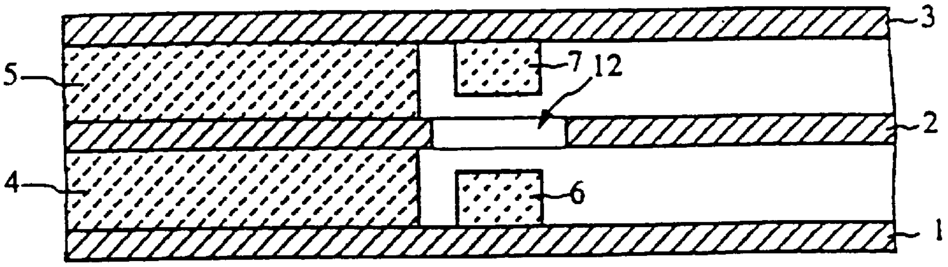
FIGS. 8A and 8B are sectional views illustrating other examples of the arrangement of dielectric resonators for interlayer connection.
Figure 8B:
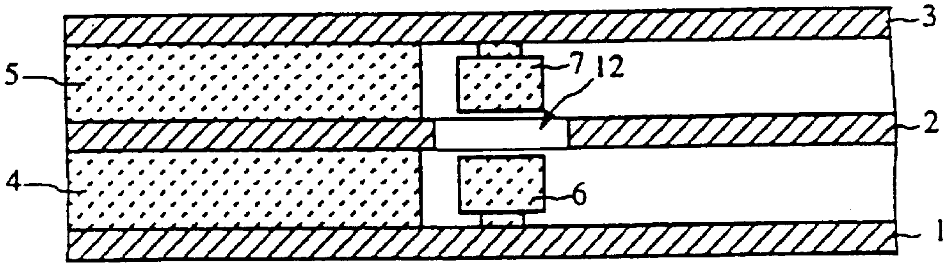

Although in each of the above-described embodiments a dielectric resonator for interlayer connection is sandwiched between two conductor plates, a dielectric resonator alternatively may be supported by either one of the upper and lower conductor plates as shown in the sectional views in FIGS. 8A–8B. In the example shown in FIG. 8A, dielectric resonators 6 and 7 are bonded to the inner surfaces of the conductor plates 1 and 3, respectively. In the example shown in FIG. 8B, the dielectric resonators 6 and 7 are fixed to the inner surfaces of the conductor plates 1 and 3, respectively, via support bases having a low dielectric constant. The dielectric resonator 6 is disposed at nearly the middle position between the conductor plates 1 and 2, and the dielectric resonator 7 is disposed at nearly the middle position between the conductor plates 2 and 3. As a result, the dielectric resonators 6 and 7 are each excited in the TE01δ mode. In these examples shown in FIGS. 8A and 8B, the inner diameter of an opening 12 can be made greater than the outer shape of the dielectric resonator, so these structures have the advantage that the degree of connection between the upper and lower dielectric resonators can be set over a wide range.

Figure 9A:
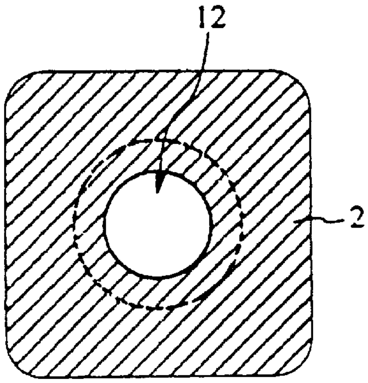
FIGS. 9A, 9B and 9C show other examples of openings in an interlayer connection portion.
Figure 9B:
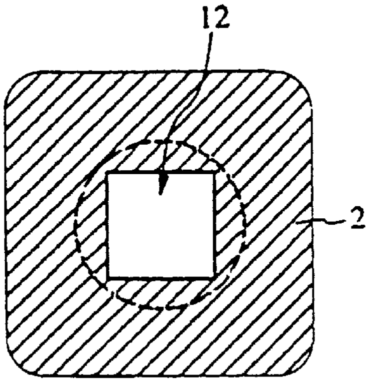
Figure 9C:
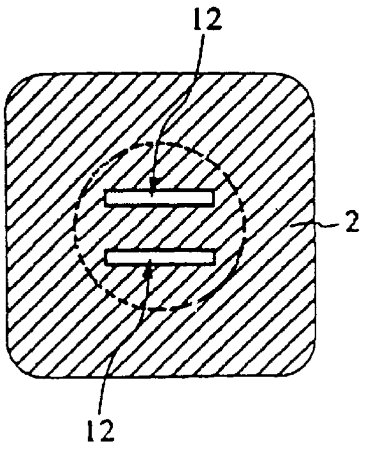

FIGS. 9A, 9B and 9C show examples of various shapes of an opening 12 provided in the conductor plate 2 in each of the above-described embodiments. As shown in FIG. 9A, a circular hole is provided, or as shown in FIG. 9B, a square hole is provided, and the degree of connection between upper and lower dielectric resonators is set according to the areas of these openings. Further, as shown in FIG. 9C, slit-shaped openings 12 are provided, and the degree of connection is set according to the width and length of the slits.

Figure 10A:
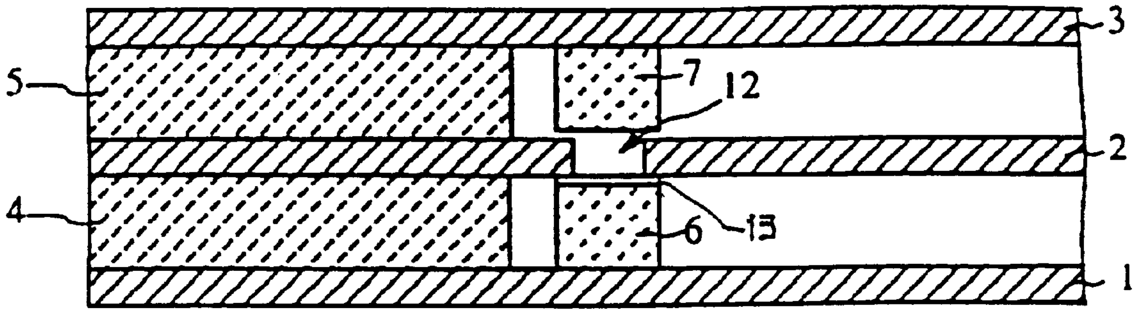
FIGS. 10A and 10B show additional examples of the interlayer connection portion.
Figure 10B:
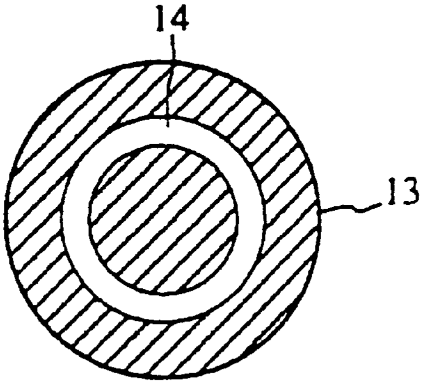

Further, as shown in FIGS. 10A and 10B, a simple opening 12 is provided in the conductor plate 2, and a substrate 13 for connection adjustment is provided on one or both of the facing surfaces of dielectric resonators 6 and 7. In this example, it is on the dielectric resonator 6. The degree of connection may be set according to an electrode pattern on the substrate. FIG. 10B shows an electrode pattern of the substrate 13, in which the hatched portion is an electrode, and the portion indicated by reference numeral 14 is a circular ring slot with no electrode. The degree of connection is set according to the diameter and width of this circular ring slot.

Figure 11A:
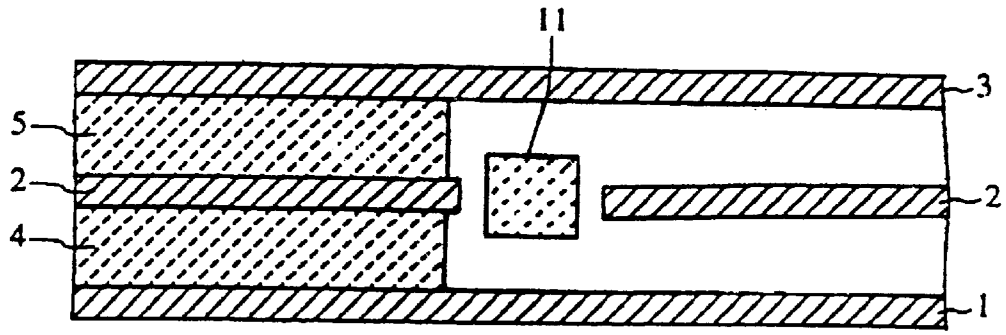
FIGS. 11A and 11B are sectional views of a multilayer dielectric line circuit according to a fifth embodiment of the present invention.
Figure 11B:
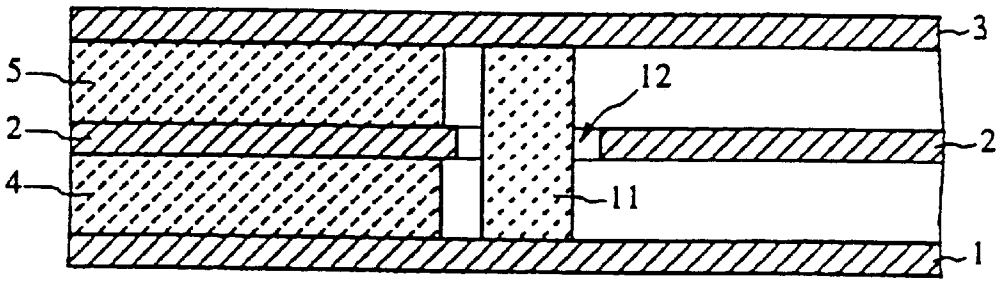
Figure 12:
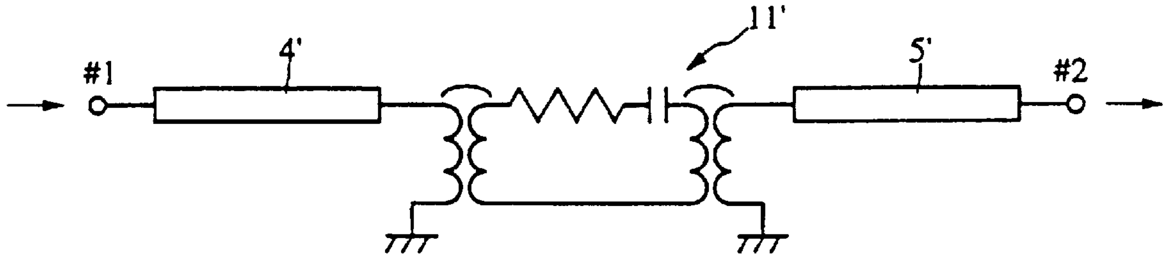
FIG. 12 is an equivalent circuit diagram of the circuit shown in FIGS. 11A–11B.

FIGS. 11A and 11B are sectional views of a multilayer dielectric line circuit according to a fifth embodiment of the present invention. FIG. 12 is an equivalent circuit diagram of the multilayer dielectric line circuit according to the fifth embodiment of the present invention. In the example shown in FIG. 11A, one dielectric resonator 11 is disposed near the respective end surfaces of both a lower dielectric strip 4 and an upper dielectric strip 5 and at nearly the middle position between the upper and lower layers. Gaps between the conductor plates 1, 2 and 3 are filled with a resin having a low dielectric constant, for example, and the dielectric resonator 11 is fixed by the resin. In the example shown in FIG. 11B, a dielectric resonator 11 is disposed between the conductor plates 1 and 3 in such a manner as to go through the opening 12 provided in the conductor plate 2. With either of the above constructions, the equivalent circuit becomes as shown in FIG. 12, the dielectric strips 4 and 5 are each magnetically connected to the dielectric resonator 11, and thus the dielectric line 4' in the lower layer and the dielectric line 5' in the upper layer are connected to each other via a one-stage resonator filter 11' (a band-pass filter).

Next, FIGS. 13A, 13B and 13C show an example of the application of the dielectric line circuit to a front-end apparatus for a millimeter-wave radar according to a sixth embodiment of the present invention. FIG. 13A shows a dielectric line circuit in an upper layer. FIG. 13B shows a dielectric line circuit in a lower layer. FIG. 13C is a sectional view of a front-end apparatus for a millimeter-wave radar, formed by assembling these two dielectric line circuits into a case. A dielectric line circuit 50 in the lower layer is formed with an oscillator 32, an interlayer connector 26, a primary vertical radiator 20, and a circuit block 22. In FIGS. 13A, 13B and 13C, the illustration of an upper conductor plate is omitted. The oscillator 32 is formed with an oscillation circuit formed of a Gunn diode or the like, and an oscillation signal therefrom is transmitted to the primary vertical radiator 20 via a dielectric strip 33, a circulator 28, and a dielectric strip 29. In the circulator 28, a terminator 31 is provided at the terminal end of a dielectric strip 30, which is one port of the circulator 28. Further, a terminator 25 is provided in one of the end portions of a dielectric strip 24, and the other end portion is connected to the interlayer connector 26. Respective portions of the dielectric strips 29 and 24 that are in proximity to each other form a coupler 23. The primary vertical radiator 20 is provided with a dielectric resonator 21, and this is excited in the HE111 mode in order to radiate linearly polarized electromagnetic waves in a direction vertical to the plane of the drawings. Meanwhile, the transmission signal is supplied to the interlayer connector 26 via the coupler 23 and the dielectric strip 24. A dielectric resonator 27 provided in the interlayer connector 26 is disposed coaxially with the dielectric resonator 35 provided in an interlayer connector 34 of the dielectric line circuit in the upper layer. A dielectric line circuit 51 in the upper layer is provided with a primary vertical radiator 40, the interlayer connector 34, and a mixer 36.

Figure 14:
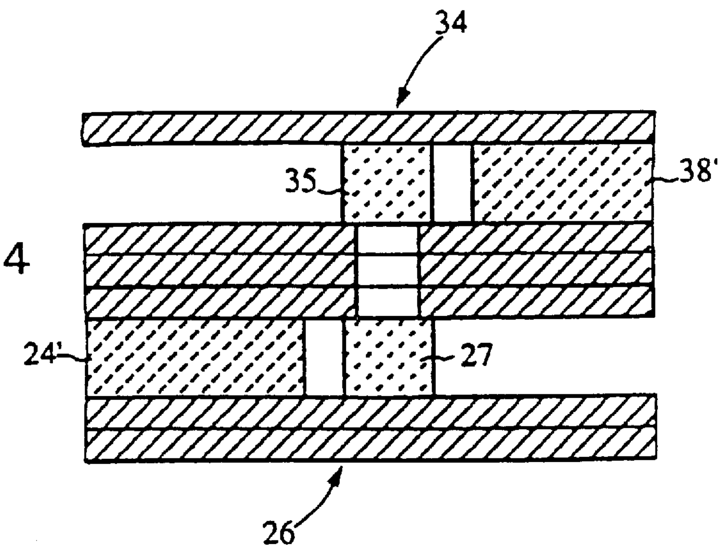
FIG. 14 is a partial sectional view of the apparatus shown in FIGS. 13A–13C.

The interlayer connectors 26 and 34 overlap so that the dielectric resonators 27 and 35 are coaxial. The sectional view of this interlayer connector is shown in FIG. 14. In FIG. 14, an opening portion is provided in the lower conductor plate of the interlayer connector 34 in the upper layer, an opening is provided in the upper conductor plate of the interlayer connector 26 in the lower layer, and the upper and lower dielectric resonators 35 and 27 are disposed to face each other in an axial direction via these openings. As a result, the dielectric resonator 27 in the lower layer and the dielectric resonator 35 in the upper layer are magnetically connected to each other.

Therefore, the above-described oscillation signal from the oscillator 32 shown in FIG. 13 is supplied as a local signal Lo to the mixer 36. Meanwhile, the waves reflected from an object excite a dielectric resonator 41 of the primary vertical radiator 40, and the received RF signal is input to the other port of the mixer 36. The two signals are mixed by a coupler 37 and output to the two ports with a phase difference of 90°. In the two ports, a mixer circuit formed of a Schottky barrier diode or the like is formed.

As shown in FIG. 13C, two dielectric line circuits 50 and 51 can be mounted into a case 54, and dielectric lenses 52 and 53 can be disposed in front of the dielectric resonators 21 and 41 of the primary vertical radiators 20 and 40, respectively.

Figure 15A:
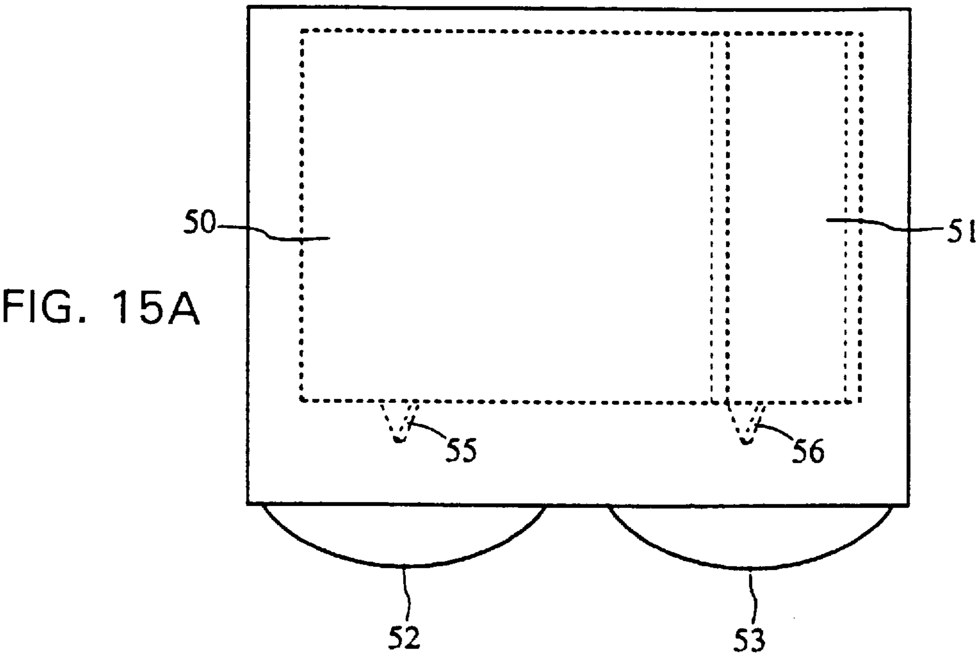
FIGS. 15A and 15B show the construction of a front-end apparatus for a millimeter-wave radar according to a seventh embodiment of the present invention.
Figure 15B:
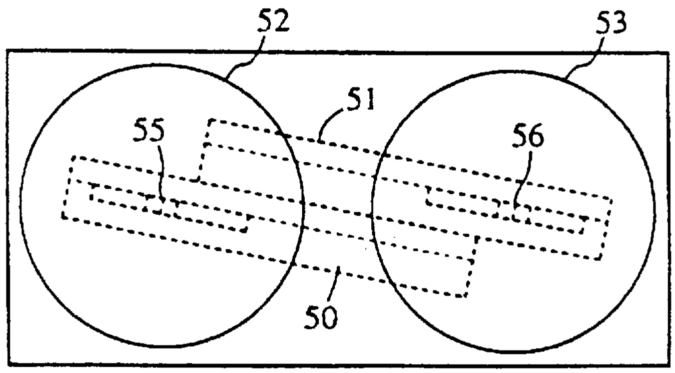
Figure 16:
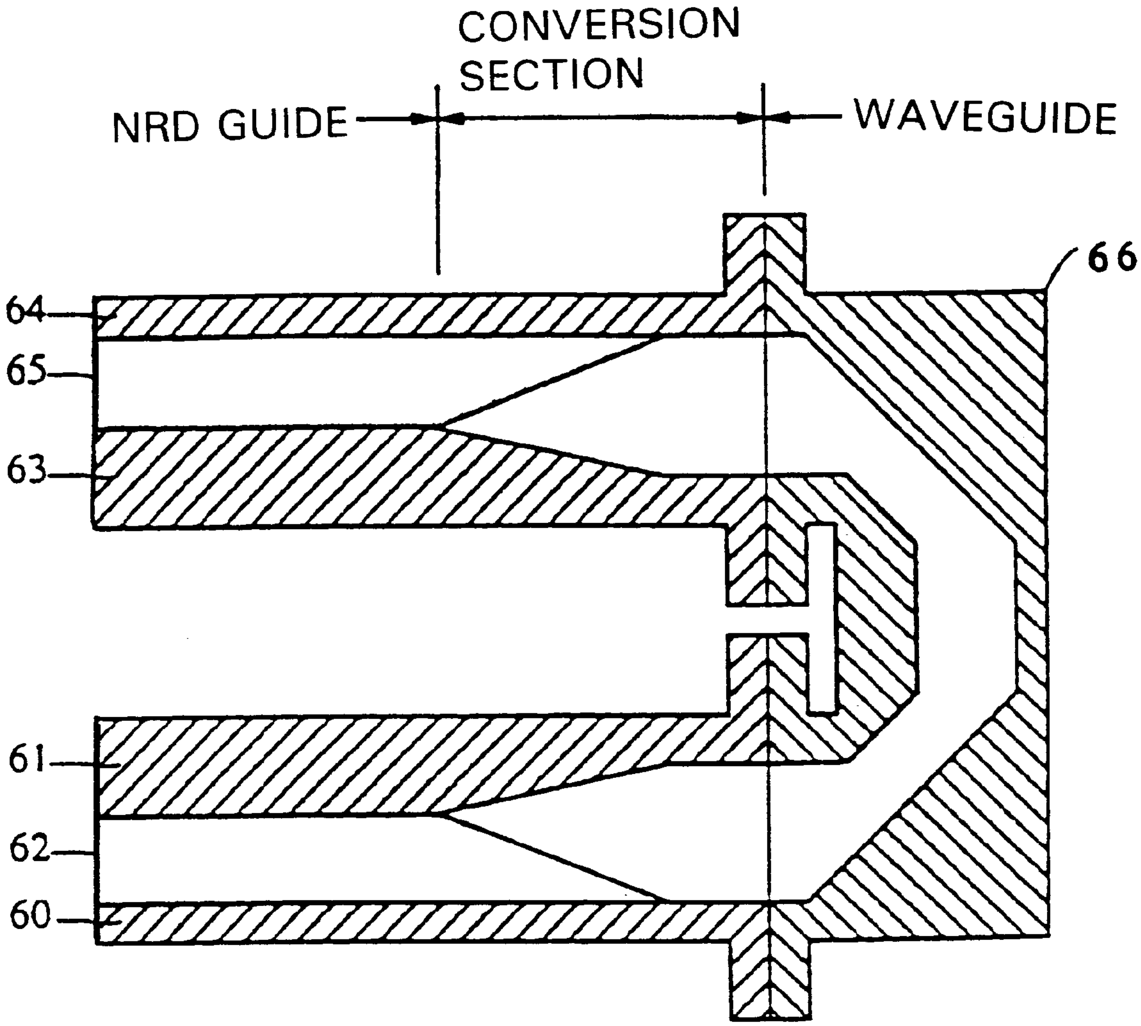
FIG. 16 PRIOR ART
FIG. 16 is a sectional view illustrating an example of the construction of an interlayer connection portion of a conventional dielectric line circuit.

FIGS. 15A and 15B show the construction of a front-end apparatus for a millimeter-wave radar according to a seventh embodiment of the present invention. FIG. 15A is a top plan view thereof. FIG. 15B is a front view thereof. The dielectric line circuit 50 in the lower layer and the dielectric line circuit 51 in the upper layer are laminated almost in the same way as in the example shown in FIGS. 13A, 13B and 13C. However, in this embodiment, a primary vertical radiator is not used. Instead, dielectric rods 55 and 56 are each made to protrude from between conductor plates, and electromagnetic waves are transmitted or received in the direction of the propagation of electromagnetic waves through the dielectric line. Further, by disposing the upper and lower dielectric line circuits 50 and 51 in a direction oblique to the case, and stacked, the dielectric lenses 52 and 53 are disposed parallel to the upper and lower surfaces of the case, and further, a smaller overall size is achieved.

According to the present invention, by forming a dielectric line into a multilayer structure, the entire area is reduced, and further, interlayer connection is performed without using a hollow waveguide, and no wasteful interlayer space occurs; thus, a smaller overall size is achieved.

Also, a multi-branching circuit having, for example, three or more ports can be easily formed within a limited space.

Further, the degree of connection between dielectric resonators for interlayer connection can be easily set and adjusted.

Still further, since connection among different layers can be made via multiple stages of dielectric resonators, a wider bandwidth can be achieved for a connection frequency band.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A multilayer dielectric line circuit comprising:

a plurality of layers, each comprising a dielectric line which includes a dielectric strip disposed between two substantially parallel conductor plates, said plurality of layers being disposed so as to form a multilayer structure, with an adjacent pair of said layers being defined by an outer pair of said conductor plates and at least one inner conductor plate which is disposed between said adjacent pair of said layers, and at least one dielectric resonator being disposed in said multilayer structure so as to electromagnetically couple the respective pair of said dielectric lines in said corresponding adjacent pair of said layers.

2. A multilayer dielectric line circuit, comprising:

a plurality of layers, each layer having a dielectric resonator, said dielectric resonator being ectromagnetically coupled to a corresponding dielectric line which comprises a dielectric strip disposed between a pair of substantially parallel conductor plates, the dielectric resonators of the respective layers being disposed close to each other so as to electromagnetically couple said dielectric resonators and thereby electromagnetically couple said dielectric lines via said dielectric resonators.

3. A multilayer dielectric line circuit according to claim 2, wherein at least one of said plurality of layers has a plurality of dielectric lines, including said first-mentioned dielectric line, said plurality of dielectric lines being coupled to said dielectric resonator.

4. A multilayer dielectric line circuit according to claim 2, further comprising a conductor pattern for electromagnetic coupling adjustment disposed between said dielectric resonators of said respective layers.

5. A multilayer dielectric line circuit according to claim 2, wherein an additional dielectric resonator is provided in at least one of said plurality of layers so that with said first-mentioned dielectric resonator and said additional dielectric resonator form a dielectric resonator filter of multiple stages.

6. A multilayer dielectric line circuit according to claim 1, wherein said at least one dielectric resonator extends from a point for being electromagnetically coupled to a first one of said pair of dielectric lines to a point for being electromagnetically coupled to a second one of said pair of dielectric lines, for electromagnetically coupling said first and second dielectric lines.

7. A multilayer dielectric line circuit according to claim 6, wherein said at least one resonator is disposed extending between said adjacent pair of layers.

8. A multilayer dielectric line circuit according to claim 7, wherein said at least one resonator is spaced away from said conductor plates.

9. A multilayer dielectric line circuit according to claim 7, wherein said at least one resonator is disposed in contact with at least one of said conductor plates.

10. A multilayer dielectric line circuit comprising:

a plurality of layers, each comprising a dielectric line which includes a dielectric strip disposed between two substantially parallel conductor plates, said plurality of layers being disposed so as to form a multilayer structure, and at least one dielectric resonator being disposed in said multilayer structure so as to electromagnetically couple a respective pair of said dielectric lines in a corresponding adjacent pair of said layers;

wherein said at least one dielectric resonator extends from a point for being electromagnetically coupled to a first one of said pair of dielectric lines to a point for being electromagnetically coupled to a second one of said pair of dielectric lines, for electromagnetically coupling said first and second dielectric lines; and wherein said pair of layers are defined by an outer pair of said conductor plates and at least one inner conductor plate, each of said pair of dielectric lines being disposed between said inner conductor plate and a corresponding one of said outer conductor plates, and said at least one resonator passes through an opening in said inner conductor plate while being out of contact with said inner conductor plate.

11. A multilayer dielectric line circuit according to claim 10, wherein said at least one resonator is spaced away from both of said outer conductor plates.

12. A multilayer dielectric line circuit according to claim 11, wherein said at least one resonator is held in said opening by a low-dielectric-constant filler material.

13. A multilayer dielectric line circuit according to claim 10, wherein said at least one resonator contacts both of said outer conductor plates.

14. A multilayer dielectric line circuit comprising:

a plurality of layers, each comprising a dielectric line which includes a dielectric strip disposed between two substantially parallel conductor plates, said plurality of layers being disposed so as to form a multilayer structure, and at least one dielectric resonator being disposed in said multilayer structure so as to electromagnetically couple a respective pair of said dielectric lines in a corresponding adjacent pair of said layers;

wherein said at least one dielectric resonator comprises a pair of resonators, each being disposed in a corresponding one of said layers, and electromagnetically coupled to a respective one of said dielectric lines, and said pair of resonators being electromagnetically coupled to each other.

15. A multilayer dielectric line circuit according to claim 4, wherein said conductor pattern has an opening defined therein between said respective dielectric resonators.

16. A radar module comprising:

a first pair of opposing conductive plates;

a first dielectric strip line disposed between said first pair of conductive plates;

a first dielectric resonator being coupled with said first dielectric strip;

a radiator being coupled with said first dielectric strip to radiate an electromagnetic wave in response to a signal received from said first dielectric strip;

a oscillator being connected to said first dielectric strip;

a second pair of opposing conductive plates;

a second dielectric strip line disposed between said second pair of conductive plates;

a second dielectric resonator being coupled with said second dielectric strip;

a receiver being coupled with said second dielectric strip to receive an electromagnetic wave reflected from an object;

a detector connected with said second dielectric strip;

wherein said first and second pairs of conductive plates are at least partially overlapped with each other.

17. A radar module according to claim 16, further comprising:

a first opening formed in one of said first pair of conductive plates, said first resonator being disposed adjacent to the first opening;

a second opening formed in one of said second pair of conductive plates, said second resonator being disposed adjacent to the second opening so as to couple with said first resonator through said first and second openings.

* * * * *